United States Patent [19]

Sprehe et al.

[11] Patent Number: 5,662,576

[45] Date of Patent: Sep. 2, 1997

[54] METHOD OF MANUFACTURING AN IMPROVED BAG FOR THE CULTIVATION OF MUSHROOM SPAWN AND APPARATUS THEREFOR

[75] Inventors: Gregory S. Sprehe, Carbondale; Lester Siebert, Cobden; William Towne, Carbondale, all of Ill.

[73] Assignee: Compac International, Inc., Carbondale, Ill.

[21] Appl. No.: 412,747

[22] Filed: Mar. 29, 1995

Related U.S. Application Data

[63] Continuation-in-part of Ser. No. 128,886, Sep. 29, 1993, abandoned.

[51] Int. Cl.$^6$ ........................................ B31B 37/18
[52] U.S. Cl. .................. 493/195; 493/210; 493/223; 493/932
[58] Field of Search ........................ 493/189, 193, 493/194, 195, 196, 199, 200, 201, 203, 208, 213, 214, 215, 224, 342, 373, 932, 343, 344, 345, 346

[56] References Cited

U.S. PATENT DOCUMENTS

| | | |
|---|---|---|
| 436,287 | 9/1890 | Marshall. |
| 2,870,954 | 1/1959 | Kulesza .................. 229/62.5 |
| 3,163,352 | 12/1964 | Fesco ........................ 229/62 |
| 3,229,813 | 1/1966 | Crowe ...................... 206/63.2 |
| 3,322,041 | 5/1967 | Fesco ........................ 93/35 |
| 3,868,891 | 3/1975 | Parish ....................... 93/8 W |
| 3,999,949 | 12/1976 | Andersson ................ 23/259 |
| 4,041,816 | 8/1977 | Shearon ................... 83/100 |
| 4,486,187 | 12/1984 | Foster ...................... 493/194 |
| 4,613,321 | 9/1986 | Kesten ..................... 493/342 |
| 5,014,493 | 5/1991 | West ........................ 53/410 |
| 5,035,684 | 7/1991 | Sorrells ................... 493/342 |
| 5,059,036 | 10/1991 | Richison .................. 383/61 |
| 5,068,005 | 11/1991 | Lindskog ................. 156/514 |
| 5,150,787 | 9/1992 | Bird ......................... 206/329 |
| 5,465,842 | 11/1995 | Utley ....................... 206/390 |

Primary Examiner—Joseph J. Hail, III
Assistant Examiner—Christopher W. Day
Attorney, Agent, or Firm—Michael Best & Friedrich

[57] ABSTRACT

A method and apparatus for manufacturing an improved bag for the cultivation of mushroom spawn is provided. The bags have continuous gas permeable sealing strips sealed to the inside walls of the bags which cover openings in the bag, so as to allow the bag to be vented without loss of moisture. The openings and sealing strips are positioned close to the top and bottom of the bag so as to maximize air flow through the mushroom spawn without creating dry spots, thereby improving spawn yield. The apparatus includes rollers for dispensing plastic film and at least one continuous hydrophobic strip of material. A series of apertures are punched by cutting dies in the film, and a vacuum system removes the cut out portions. The strip of material is positioned over the apertures and sealed by sealing dies over them, so as to enclose the apertures. A cutting dies cuts off the film and strips. A conventional bag making machine then forms the bags.

20 Claims, 2 Drawing Sheets

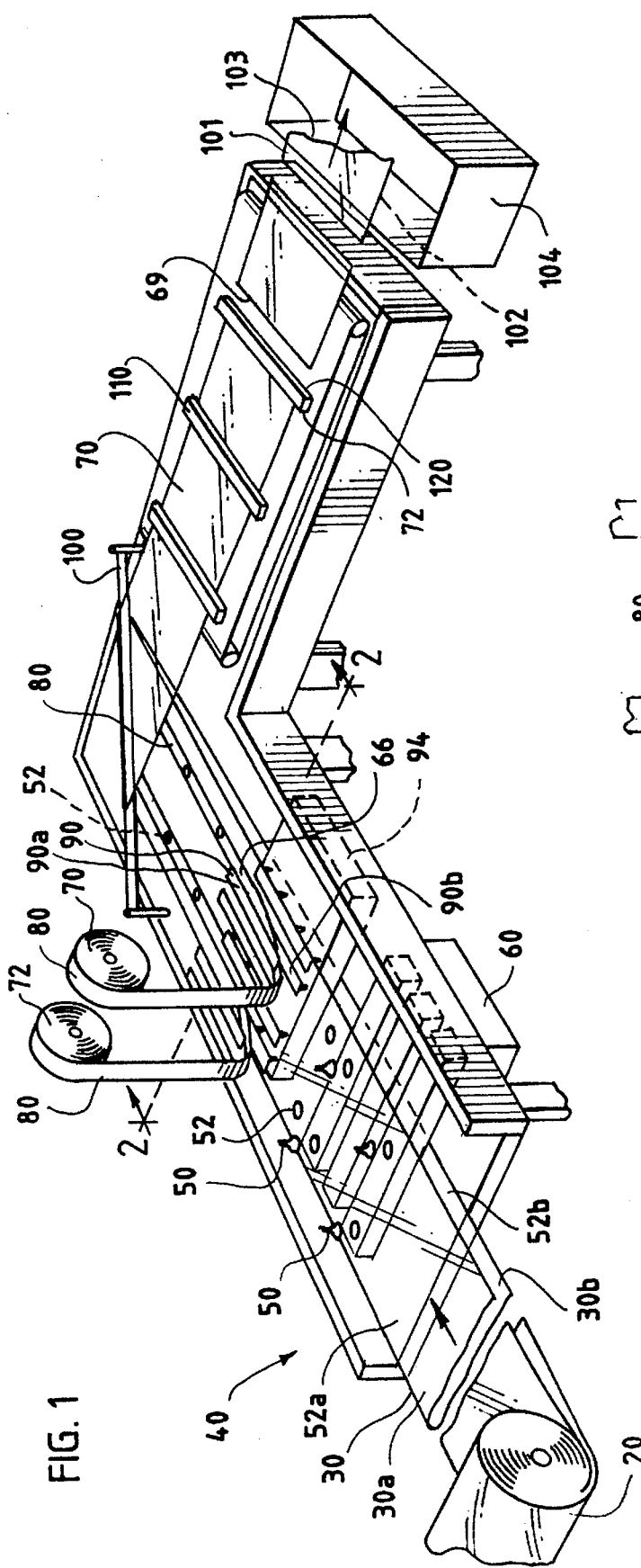
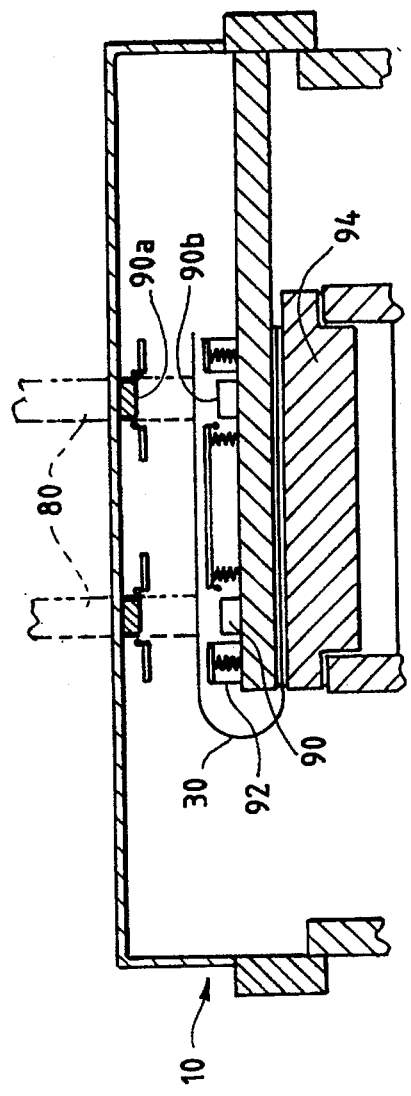
FIG. 1
FIG. 2 ific embodi-
METHOD OF MANUFACTURING AN IMPROVED BAG FOR THE CULTIVATION OF MUSHROOM SPAWN AND APPARATUS THEREFOR This is a continuation-in-part application of U.S. patent application Ser. No. 08/128,886, filed Sep. 29, 1993 now abandoned.

BACKGROUND OF THE INVENTION

The present invention relates generally to a method of manufacturing plastic bags and more particularly to a novel method of manufacturing a gas permeable bag suitable for use in the cultivation of mushroom spawn which includes the apparatus upon which the method is performed.

U.S. Pat. No. 2,851,821 discloses mushroom spawn grown in a plastic bag. The bag is closed by turning the ends of the bag and forming a chimney, and it is sealed by placing a wad of cotton or the like in the chimney thus formed. In another embodiment, a tube is inserted in the top of the bag and the bag is gathered around the tube of the string. A filter plug is then placed in the tube.

Another method is described in U.S. Pat. No. 4,027,427 wherein the spawn is grown in a plastic bag provided with a temporary filter cover. This bag is provided with a removal closure mechanism for filling the bag and maintaining sterility during the processing steps.

U.S. Pat. No. 4,977,702 discloses a bag for the production of eatable mushrooms which is provided with a number of gas exchange surfaces or membranes which are impervious to outside microorganisms, thereby avoiding contamination of the nutrient substrate by outside microorganisms. Inoculation can be performed by injection of the inoculum in suspension through the plastic bag. The gas exchange membranes of the bag may be made of Dupont Tyvek® spun bonded polyolefin. U.S. Pat. No. 4,311,477 teaches a bag for cultivating mushrooms constructed, at least in part, from a micro-porous film having gas permeability, but which does not pass bacteria and infectious microbes.

The following U.S. and foreign references were identified as being relevant to the present invention:

U.S. Pat. No. 4,878,312 CHIMICU, U.S. Pat. No. 4,977,702 FORTIN ET AL.: EP No. 83-742416; JAPAN 2286-012; JAPAN 2-4673; GERMANY 3734-509-A; SWITZERLAND 647-209-A; GREAT BRITAIN 1,176,188 and GERMANY 148,436.

The production of mushrooms in plastic bags is well known in the art. Plastic as a material from which bags are made has been used advantageously in the field primarily because of the low manufacturing cost of such bags and the ease with which the bags are sterilized. However, maintaining an uncontaminated growing environment must be balanced with the ability to provide adequate airflow to the mushroom spawn. Accordingly, the need has developed a method for manufacturing such a bag and, appropriately, an apparatus for practicing the method thereon.

SUMMARY OF THE INVENTION

A method of manufacturing an improved bag for the cultivation of mushroom spawn and the apparatus upon which the method is practiced is disclosed. The method comprises the following steps. A web of thermoplastic film is dispensed. A series of apertures are cut in the web. A continuous strip of gas permeable hydrophobic film is dispensed onto the web and over the apertures. The continuous strip of gas permeable film is sealed to the web in a pattern which circumscribes and seals each of the openings. The web is then folded and sealed along at least two edges to form a bag. The bag is then cut from the web. A particular feature of the invention is the use of a continuous strip of gas permeable film, which makes handling of the film much easier, significantly increases production speed and eliminates defective bags.

The apparatus for manufacturing the improved bag according to the above described method comprises the following components. A roller dispenses a web of thermoplastic material into a conventional bag making machine. A cutting die then cuts a series of openings in the web and a vacuum system removes the plastic film which is cut out of the web and collects it for recycling. Rollers containing continuous strips of Tyvek® spun bonded polyolefin material dispense the strips onto the web and seal the strips to the web such that the strips cover the perforations previously made. A transverse pressure seal then heat seals the edges of the web and a cutting bar automatically cuts the web which now contains the applied gas permeable strips to the desired length.

Other features and advantages of the invention will become apparent to those of ordinary skill in the art upon review of the following detailed description, claims, and drawings.

BRIEF DESCRIPTION OF THE DRAWINGS

FIG. 1 is a front perspective view of the apparatus for practicing the method of manufacturing an improved bag for the cultivation of mushroom spawn.

FIG. 2 is a front cut away view of an apparatus for practicing the method of manufacturing an improved bag for the cultivation of mushroom spawn.

DETAILED DESCRIPTION OF THE PREFERRED EMBODIMENTS

Figure 3:
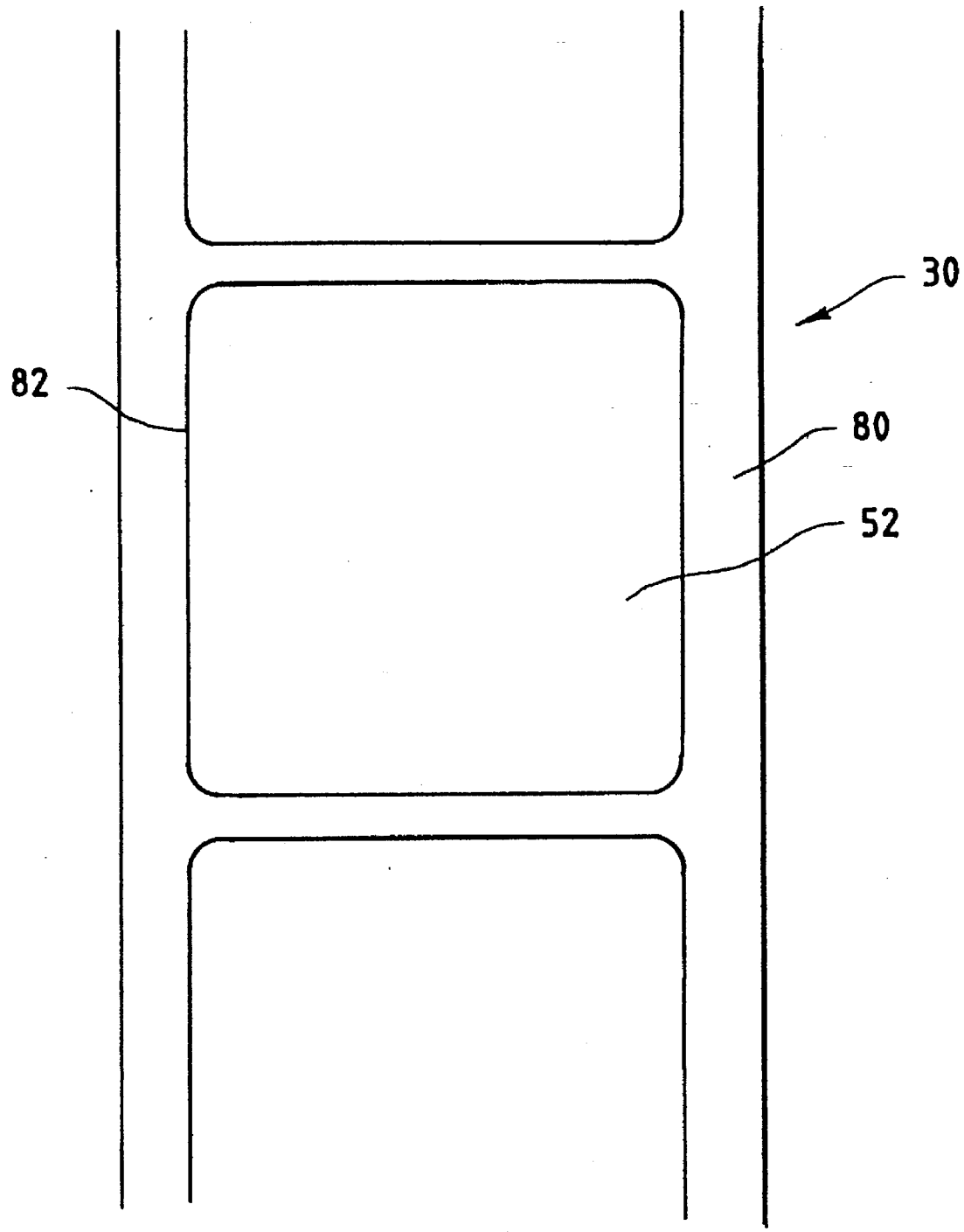
FIG. 3 is a cross sectional view showing the pattern of the seal bars of an apparatus for practicing the method of manufacturing an improved bag for the cultivation of mushroom spawn.

While the present invention is susceptible of embodiment in many different forms, there is shown in the drawings and will herein be described in detail several specific embodiments with the understanding that the invention is not limited thereto except insofar as those who have the disclosure before them are able to make modifications and variations without departing from the scope of the invention.

FIG. 1 is a front perspective view of the apparatus for practicing the method of manufacturing an improved bag for the cultivation of mushroom spawn. FIG. 1 shows a roller 20 dispensing a web 30 into a bag making machine 40. A cutting die 50 is shown perforating web 30 and creating openings 52. A vacuum system 60 is shown removing debris cut from web 30 by cutting die 50. Rollers 70 and 72 are shown dispensing continuous gas permeable strips 80. Sealing die 90 is shown attaching the continuous gas permeable strips 80 to the web 30. Roller bar 100 is shown turning the web 30 and directing the web 30 toward transverse pressure seal 110. Cutting bar 120 is shown cutting a web 30 into appropriately sized bags 101.

In one preferred embodiment, the rollers 20 which dispense the web 30 will be approximately 24 inches wide. The web 30 consists of a U-shaped piece of polymeric material. The material for the web 30 is characterized by its opacity and its water resistance. The web 30 in a preferred embodiment is made of polyethylene, similar to the type sold by First Brands Industries Corporation under the trademark, Glad Bags. Other materials of which web 30 may be constructed may be found in the parent patent application Ser. No. 08/128,886 with filing date of Sep. 29, 1993, and which is incorporated herein by reference hereto. Since web 30 is constructed of a polymeric material, it is important to avoid excessive roller pressure, as the material may be subjected to stretching.

Cutting die 50 performs the task of cutting holes within the web 30. In a preferred embodiment, cutting die 50 punches two sets of two holes each in web 30. Since these holes are to be later covered with continuous strips 80, the holes must be slightly smaller than the width of strips 80. The openings 52 may be made with traditional punching equipment, including rotary sprocket punching, a rotary punching die addition 130, and rotary line punching equipment. In a preferred embodiment, the cutting die 50 utilizes steel dies. However, in other embodiments, a soft self-honing male punch in a hardened female die may be used. After the openings 52 are punched in web 30, vacuum system 60 performs the function of removing the punched debris away from the apparatus 10. The rollers 70 and 72 dispense continuous gas permeable strips 80 such that the gas permeable strips 80 are aligned with openings 52. In a preferred embodiment, the continuous gas permeable strips 80 are made of porous material which is sold by DuPont Company, Wilmington, Del. under the trademark name Tyvek®. Since Tyvek® is constructed of spun bonded polyolefin, which is also a polymeric material, the rollers 70 and 72 are adjustable to compensate for the stretching of the polymeric material. In a preferred embodiment, rollers 70 and 72 dispense two rolls of continuous gas permeable strips 80 such that the strips 80 are approximately 10½" apart measured from the inner edge of strips 80. In other embodiments, the strips may be closer or further apart, depending on the specifications of the manufacturer and the location of openings 52. In a variant, roller 20 has optional gas permeable strips 80' thereon so that a single roller 20 dispenses web 30 and optional gas permeable strips 80'.

The sealing die 90 then performs the attachment of the continuous gas permeable strip 80 to the web 30. Sealing die 90 attaches the strips 80 to the web 30 by hermetically sealing the strips 80 around the opening 52. Since the resultant bag 101 has novel barrier capabilities, it is important that the gas permeable strips 80 completely cover and surround the perimeter of the opening 52. The hermetic seal may be formed by conventional heat sealing methods, including by way of example, optional heat sealing addition 160. In a preferred embodiment where the gas permeable strips 80 are made of Tyvek, hot bar or impulse techniques for heat sealing may be used. Further, where such techniques reduce the strength of the seal, coatings such as branched polyethylene may be utilized to achieve a high seal strength. In other embodiments, optional ultrasonic sealing addition 140, chemical sealing, and advanced optional dielectric sealing addition 150 may also be used to create strong seals. Further, the use of adhesives, or other sealing mechanisms are contemplated.

The transverse pressure seal die 110 then performs a sealing operation across the web 30 creating what will be the edges of the bag. In one embodiment of the invention, the transverse pressure seals are made approximately every 15 inches, resulting in a bag 101 with a corresponding width. In a preferred embodiment, the transverse pressure seal die 110 creates a seal approximately ½" in width. This allows cutting bar 120 to cut the web 30 into individual bags 101 while still allowing for an adequate seal to remain at each edge of the bag 101. In other embodiments, similar trim seals dies, which create a strong and hermetic seal, may also be utilized.

As shown in FIG. 1 of the drawings, the present invention also includes a method of manufacturing improved gas permeable bag 101, as described above. The method includes the steps of dispensing a web 30 of thermoplastic film from a roller 20 on a conventional bag making machine 10. A series of openings 52 are cut in web 30 by means of cutting die 50. Alternatively, the web 30 may have openings 52 precut therethrough. In the preferred embodiment, openings 52 are oval in shape. A vacuum system 60 then removes the oval plastic film cut from web 30 and collects it for recycling. A pair of continuous strips 80 of gas permeable hydrophobic film are dispensed from rollers 70 and 72 onto web 30 so as to cover the rows 52a and 52b of the openings 52. Sealing die 90, in the embodiment shown, has a rectangular grid 66 which is sized to surround the openings 52 and to seal the gas permeable strips 80 to the web 30 along the lateral margins of the grid 66. Sealing die 90 is heated and applied under pressure (90 lbs./sq. in.) to web 30 to effect this seal. Conventional means of preventing the sealing together of upper portion 30a and lower portion 30b of web 30 are provided by platform 94. A cutting bar 120 automatically cuts gas permeable strips 80 and bag 101 to the desired length. Gas permeable strips 80 cover the openings 52 close to what will later be the top 103 of a bag 101 and the bottom 102 of bag 101, respectively.

A transverse seal 69 is formed across web 30 by sealing die 72 across the half folded web 70. This transverse seal 69 is then repeated after half folded web 70 has been advanced the desired distance, to create a bag 101 of the desired width. Transverse sealing die 72 further includes a cutting die 120 which separates bag 101 from the remainder of half folded web 70. Bag 101 is then conveyed into an accumulation area 104 where a plurality of bags 101 are accumulated for packing and shipping. In a preferred embodiment, bag 101 is formed as a flat bag having a length of approximately 23⅞" by 14⅞" wide. However, other sizes may be utilized.

It has been found through the use of bags such as bag 20, that the quantity of mushroom grown using identical spawning techniques is increased from 15% to 33% without an increase in cost. Accordingly, a strong demand for this product is anticipated.

FIG. 2 is a cross sectional view showing sealing die 90 of an apparatus for practicing the method of manufacturing an improved bag for the cultivation of mushroom spawn taken along section line 2—2. FIG. 2 shows how the web 30 travels through the apparatus 10 in a foldover configuration. The gas permeable strips 80 are shown being dispensed towards web 30. The web guides 92 are shown in FIG. 2 in an inactive position. However, web guides 92, upon contact of the male sealing die 90A, with female sealing die 90B provide a tension and control mechanism for the web 30 during the sealing process. The platform 94 also provides tension and control to the untreated side of the web 30. It should be noted that in this embodiment, only one side of the web 30 is treated with the gas permeable strips 80. However, manufacturing considerations may dictate not only the number of strips to be applied to the webbing, but the location and the method of sealing as well.

FIG. 3 is a view of the footprint made by the sealing die of an apparatus for practicing the method of manufacturing an improved bag for the cultivation of mushroom spawn.

FIG. 3 shows the webbing 30 having a gas permeable strip 80 attached to it. FIG. 3 also shows opening 52 covered by the gas permeable strip 80, and surrounding by the hermetic seal 82.

While a preferred embodiment of the invention has been described, by way of example, various modifications will become apparent to one of ordinary skill in the art. Thus, the scope of the invention is to be limited only by the spirit and scope of the following claims.

I claim:

1. An improved method of manufacturing gas permeable water vapor barrier bags for the production of mushroom spawn comprising the steps of:

dispensing a web of thermoplastic film;
  cutting a series of substantially aligned apertures in said film to form a series of openings;
  removing resulting cut film from said serious of apertures;
  dispensing at least one continuous strip of gas permeable hydrophobic film onto said web and over said series of openings, said at least one continuous strip of gas permeable hydrophobic film being of sufficient size to cover and be circumferentially sealed around each of said series of openings and to contribute to manufacturing ease of said bag and a reduction in the amount of labor associated with the production thereof;
  continuously sealing said continuous strip of gas permeable film to said web in a pattern which circumscribes and seals said continuous strip of gas permeable film around each of said series of openings;
  cutting said strip to a desired length;
  folding said web;
  sealing said web along at least two edges thereof to form a series of interconnected bags; and
  cutting said series of interconnected bags from said web to form a bag having enhanced moisture retention within the bag to thereby reduce dry spots in said mushroom spawn and improve spawn yield.

2. The improved method of claim 1 and further comprising:

folding said web of thermoplastic film in a foldover configuration.

3. The improved method of claim 1 wherein said step of cutting a series of apertures in said film comprises:

punching a cutting die through said film.

4. The improved method of claim 1 wherein said step of cutting a series of apertures in said film further includes using a conventional punching die.

5. The improved method of claim 4 wherein said step of cutting a series of apertures comprises:

using a rotary punching die.

6. The improved method of claim 1 wherein said step of cutting a series of apertures in said film comprises:

providing a male cutting die;
  providing a female cutting die; and,
  mating said male cutting die with said female cutting die.

7. The improved method of claim 1 wherein said step of cutting a series of apertures in said film comprises:

cutting a series of ½" to 1" apertures in said film.

8. The improved method of claim 1 wherein said step of cutting a series of apertures in said film comprises:

cutting a series of ¼" to 3" diameter apertures in said film.

9. The improved method of claim 1 wherein said step of cutting a series of apertures in said film comprises:

cutting a series of parallel apertures in said film.

10. The improved method of claim 1 wherein said step of dispensing at least one continuous strip of gas permeable hydrophobic film onto said web and over said series of openings comprises:

providing at least one continuous strip of spun bonded polyolefin film.

11. The improved method of claim 1 wherein said step of dispensing at least one continuous strip of gas permeable hydrophobic film onto said web and over said series of openings comprises:

dispensing two continuous strips of gas permeable hydrophobic film onto said web and over said series of openings.

12. The improved method of claim 1 wherein said step of dispensing at least one continuous strip of gas permeable hydrophobic film onto said web and over said series of openings comprises:

providing at least one continuous strip of gas permeable hydrophobic film having a width in the range of 1' to 2".

13. The improved method of claim 1 wherein said step of continuously sealing said continuous strip of gas permeable film to said web in a pattern which circumscribes and seals said continuous strip of gas permeable film around each of said series of openings comprises:

heat sealing said continuous strip of gas permeable film to said web in a pattern which circumscribes and seals said continuous strip of gas permeable film around each of said series of openings.

14. The improved method of claim 13 wherein said step of continuously sealing said continuous strip of gas permeable film to said web in a pattern which circumscribes and seals said continuous strip of gas permeable film around each of said series of openings comprises:

heating said continuous strip of gas permeable film to said web in a pattern which circumscribes and seals said continuous strip of gas permeable film around each of said series of openings to a temperature within the range 125 C.–135 C.

15. The improved method of claim 1 wherein said step of continuously sealing said continuous strip of gas permeable film to said web in a pattern which circumscribes and seals said continuous strip of gas permeable film around each of said series of openings comprises:

adhesive sealing said continuous strip of gas permeable film to said web in a pattern which circumscribes and seals said continuous strip of gas permeable film around each of said series of openings.

16. The improved method of claim 1 wherein said step of continuously sealing said continuous strip of gas permeable film to said web in a pattern which circumscribes and seals said continuous strip of gas permeable film around each of said series of openings comprises:

ultrasonic sealing said continuous strip of gas permeable film to said web in a pattern which circumscribes and seals said continuous strip of gas permeable film around each of said series of openings.

17. The improved method of claim 1 wherein said step of continuously sealing said continuous strip of gas permeable film to said web in a pattern which circumscribes and seals said continuous strip of gas permeable film around each of said series of openings comprises:

dielectrically sealing said continuous strip of gas permeable film to said web in a pattern which circumscribes and seals said continuous strip of gas permeable film around each of said series of openings.

18. The improved method of claim 1 wherein said step of sealing said web along at least two edges thereof to form a bag comprises:

heat sealing said web along at least two edges thereof to form a series of interconnected bags.

19. An apparatus for practicing the improved method of manufacturing gas permeable water vapor barrier bags for the production of mushroom spawn comprising:

roller means for dispensing plastic film from a web of thermoplastic film and for dispensing a continuous strip of gas permeable hydrophobic film;

a conventional bag making machine attached to said roller for making said plastic film into bags;

a cutting die within said conventional bag making machine for cutting a series of substantially aligned apertures in said film to form a series of openings;

a vacuum system means adjacent said cutting die for removing cut film from said series of apertures by said cutting die;

at least one roller means for dispensing said continuous strip of gas permeable hydrophobic film over said series of openings, said at least one continuous strip of gas permeable hydrophobic film being of sufficient size to cover and be circumferentially sealed around each of said series of opening and to contribute to manufacturing ease of said bag and a reduction in the amount of labor associated with the production thereof;

a pair of sealing dies for continuously sealing said continuous strip of gas permeable film to said web in a pattern which circumscribes and seals said continuous strip of gas permeable film around each of said series of openings; and a cutting bar adjacent said seal die for cutting said continuous strip of hydrophobic film and said thermoplastic film to form a bag having enhanced moisture retention within the bag to thereby reduce dry spots in said mushroom spawn and improve spawn yield.

20. An improved apparatus for manufacturing gas permeable water vapor barrier bags for the production of mushroom spawn from a web of thermoplastic film and a ship of gas permeable material, and a bag making machine, the improvement comprising:

roller suitable for dispensing a web of thermoplastic film;

a cutting die for cutting a series of substantially aligned apertures in said film to form a series of openings;

a vacuum system adjacent said cutting die for removing cut out film from said series of apertures;

means for applying said continuous strip of gas permeable material to said film and over said series of openings, said continuous strip of gas permeable material being of sufficient size to cover and be circumferentially sealed around each of said series of openings and to contribute to manufacturing ease of said bag and a reduction in the amount of labor associated with the production thereof;

a sealing die for sealing said continuous strip to said film in a pattern which circumscribes and seals said continuous strip around each of said series of openings; and a cutting bar for cutting said film and said strip to form a bag having enhanced moisture retention within the bag to thereby reduce dry spots in said mushroom spawn and improve spawn yield.

* * * * *